US007542569B1

(12) United States Patent
Leiwo (10) Patent No.: US 7,542,569 B1
(45) Date of Patent: Jun. 2, 2009

(54) SECURITY OF DATA CONNECTIONS (75) Inventor: Jussipekka Leiwo, Amstelveen (NL)

(73) Assignee: Nokia Siemens Networks OY, Espoo (FI)

( * ) Notice: Subject to any disclaimer, the term of this patent is extended or adjusted under 35 U.S.C. 154(b) by 0 days.

(21) Appl. No.: 09/571,572

(22) Filed: May 17, 2000

Related U.S. Application Data

(63) Continuation of application No. PCT/FI98/00928, filed on Nov. 26, 1998.

(30) Foreign Application Priority Data

Nov. 26, 1997 (FI) .................................. 974341

(51) Int. Cl.
*H04K 1/00* (2006.01)
*H04L 9/00* (2006.01)
*G06F 7/04* (2006.01)
*H04M 1/66* (2006.01)
(52) U.S. Cl. ...................... 380/247; 380/255; 380/270; 380/272; 713/150; 713/161; 713/168; 713/170; 713/176; 713/180; 713/182; 726/4; 455/410
(58) Field of Classification Search ................. 380/247, 380/270; 713/200, 201
See application file for complete search history.

(56) References Cited

U.S. PATENT DOCUMENTS

| 4,262,329 | A | * | 4/1981 | Bright et al. ................. 364/200 |
| 5,204,902 | A | * | 4/1993 | Reeds, III et al. ............. 380/23 |
| 5,249,230 | A | * | 9/1993 | Mihm, Jr. ..................... 380/23 |
| 5,341,499 | A | * | 8/1994 | Doragh ......................... 395/700 |
| 5,371,794 | A | * | 12/1994 | Diffie et al. ................... 713/156 |
| 5,377,267 | A | * | 12/1994 | Suzuki et al. ................. 380/248 |
| 5,386,468 | A | * | 1/1995 | Akiyama et al. .............. 380/25 |

(Continued)

FOREIGN PATENT DOCUMENTS

EP          0 481 121          4/1992

(Continued)

OTHER PUBLICATIONS

Newton, Harry, Newton's Telecom Dictionary, 1998, 14th updated and expanded edition, pp. 213, 720, 748.*

(Continued)

*Primary Examiner*—Christopher A Revak
*Assistant Examiner*—Aravind K Moorthy
(74) *Attorney, Agent, or Firm*—Squire, Sanders & Dempsey, LLP (57) ABSTRACT

The invention concerns the security of the data connections of a telephone user. The basic idea of the invention is to forward the authentication of a telephone system to the leg between two private data networks connected via an arbitrating network. When establishing the connection, the private network connected to the telephone system forwards the authenticated subscriber identity to the other private network. To provide the identity forwarded with authenticity, the message containing the identity is signed. To provide encryption of the subscriber identity, the message is encrypted using a public key method. In response the second private network generates a session key to be used in the connection. This key is signed and encrypted using a public key method and sent to the first private network. During the connection, a symmetrical encryption method with the session key is used.

29 Claims, 11 Drawing Sheets

U.S. PATENT DOCUMENTS

| | | | | |
|---|---|---|---|---|
| 5,457,737 | A * | 10/1995 | Wen | 379/62 |
| 5,546,463 | A * | 8/1996 | Caputo et al. | 380/25 |
| 5,557,678 | A * | 9/1996 | Ganesan | 380/282 |
| 5,706,347 | A * | 1/1998 | Burke et al. | 380/21 |
| 5,809,144 | A * | 9/1998 | Sirbu et al. | 705/53 |
| 5,850,444 | A * | 12/1998 | Rune | 705/79 |
| 6,061,796 | A * | 5/2000 | Chen et al. | 713/201 |
| 6,134,432 | A * | 10/2000 | Holmes et al. | 455/412.1 |
| 6,285,991 | B1 * | 9/2001 | Powar | 705/76 |
| 6,408,175 | B1 * | 6/2002 | Park | 455/411 |
| 6,532,290 | B1 * | 3/2003 | Dent | 380/247 |
| 6,829,356 | B1 * | 12/2004 | Ford | 380/44 |
| 7,480,801 | B2 * | 1/2009 | Euchner et al. | 713/171 |
| 7,480,939 | B1 * | 1/2009 | Nessett et al. | 726/22 |
| 2008/0109448 | A1 * | 5/2008 | Aboel-Nil et al. | 707/10 |
| 2008/0294891 | A1 * | 11/2008 | Ram OV et al. | 713/158 |

FOREIGN PATENT DOCUMENTS

| | | |
|---|---|---|
| EP | 0 739 105 | 10/1996 |
| EP | 1331614 A2 * | 7/2003 |
| GB | 2 279 540 | 1/1995 |
| GB | 2 287 160 | 9/1995 |
| WO | 95/23473 | 8/1995 |
| WO | 96/05675 | 2/1996 |
| WO | 97/24831 | 7/1997 |
| WO | WO 9927678 A2 * | 6/1999 |

OTHER PUBLICATIONS

Schneier, Bruce, Applied Cryptography, 1996, John Wiley & Sons, Inc., Second Edition, pp. 31, 37, 53, 54.*

Harn et al, On the Security of Wireless Network Access with Enhancements, 2003, ACM, pp. 88-95.*

Bhargavan et al, Verifying Policy-Based Web Services Security, 2008, ACM, pp. 1-59.*

Lee et al, Mobile IP and WLAN with AAA authentication protocol using identity-based cryptography, 2003, IEEE, pp. 597-603.*

Elkamshoushy et al, New Proxy Signcryption Scheme with DSA Verifier, 2006, IEEE, pp. 1-8.*

* cited by examiner

(PRIOR ART)

FIG. 4.

(PRIOR ART)

FIG. 5.

(PRIOR ART)

FIG. 6.

(PRIOR ART)

FIG. 7.

(PRIOR ART)

SECURITY OF DATA CONNECTIONS

This application is a continuation of international application serial number PCT/FI98/00928, filed 26 Nov. 1998.

FIELD OF THE INVENTION

This invention relates to the securing of data connections in data networks connected to telephone networks, especially mobile telecommunication networks.

BACKGROUND OF THE INVENTION

Figure 1:
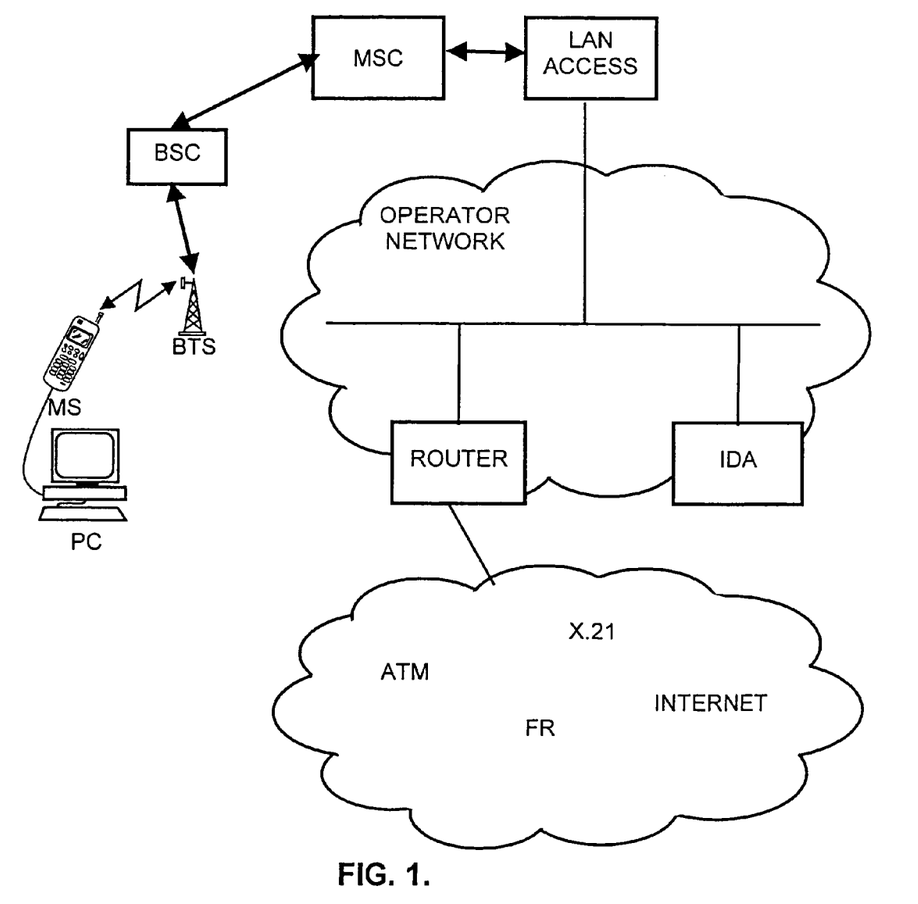
FIG. 1 shows a mobile telecommunication system connected to data networks.

An arrangement for connecting a mobile telecommunication sub-scriber to data services is shown in FIG. 1. In the figure, the subscriber has connected his computer PC (Personal Computer) to his GSM Mobile Station MS. The MS has established a connection to a Base Transceiver Station BTS of the GSM network. The BTS forwards the information sent by the MS to the Base Station Controller BSC, which in turn forwards the information to the Mobile Switching Center MSC. The MSC is connected to the private data network of the operator using the LAN access unit. In the private network, the Intelligent Data Agent IDA provides intelligence for purposes such as billing and the operation and maintenance of data connections. The private network is connected to other networks such as ATM (Asynchronous Trans-fer Mode), X.21, Frame Relay FR and Internet.

Figure 2:
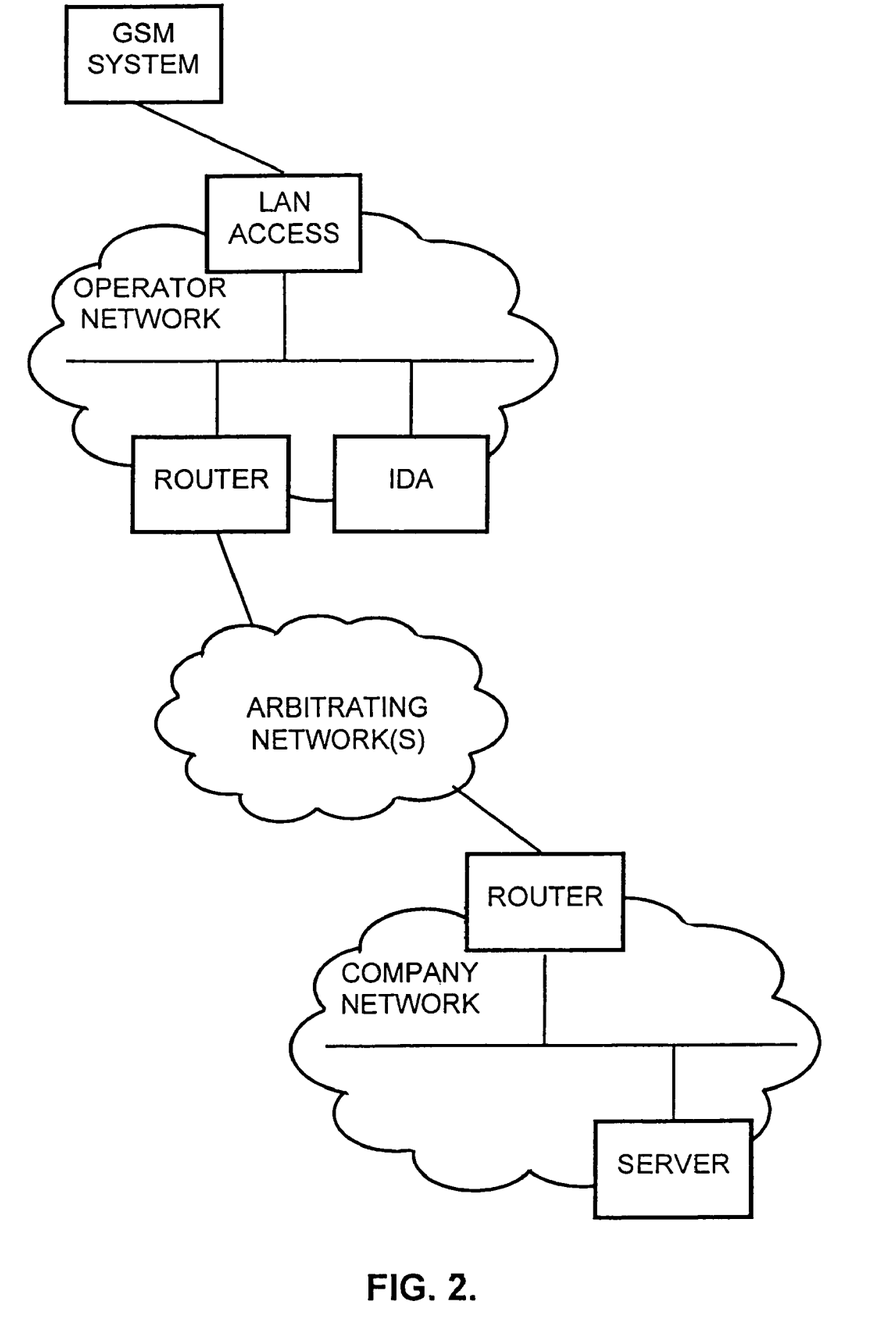
FIG. 2 shows two private data networks connected via arbitrating networks.

An arrangement whereby the subscriber uses the services provided by a server in another private network is shown in FIG. 2. According to the figure, the second private network is connected to the operator network via an arbitrating network or a plurality of arbitrating networks. When the private network is a private network of a company, for example, the security of the data connection from the subscriber to the server must be enforced. The GSM system provides authentication and secure data transmission between the mobile subscriber MS and the mobile switching center MSC.

In GSM, the authentication process is based on a challenge-response process, whereby the network sends the Subscriber Identity Module SIM installed in the mobile station a random challenge. The mobile station replies with a response according to calculations based on the random challenge and a secret key known only by the autheritication center of the network and the SIM. The response of the random challenge and the secret key is calculated in the authentication center also. If the responses calculated by the SIM and the authentication center are identical, mobile sub-scriber authenticity has been established by the authentication process.

Data transmission between the base station and the mobile station is encrypted with a secret encryption key calculated on the basis of the random challenge and the secret key. This method of secret key encryption, which is also called the symmetrical encryption method, will be described in more detail later.

Although it may be assumed that the GSM connections are secure, the connection between the subscriber and the server is insecure if no authentication and encryption are used over the arbitrating network.

Figure 3:
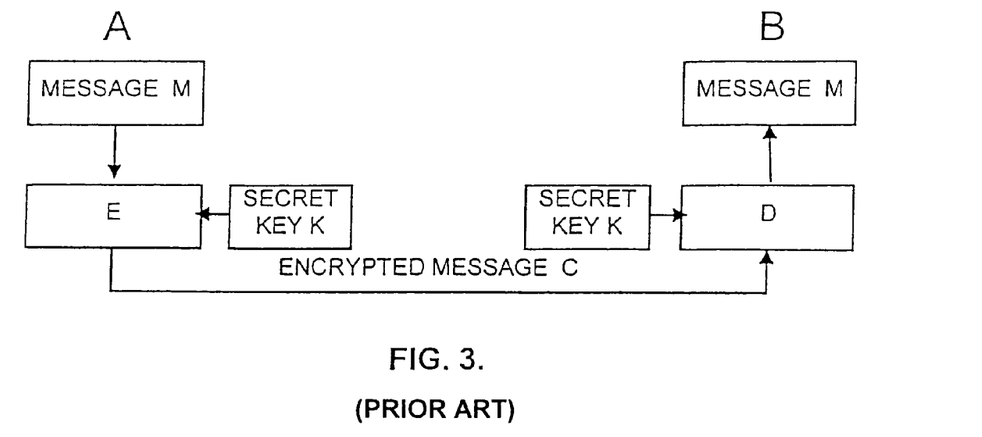
FIG. 3 shows a symmetric encryption procedure.
Figure 4:
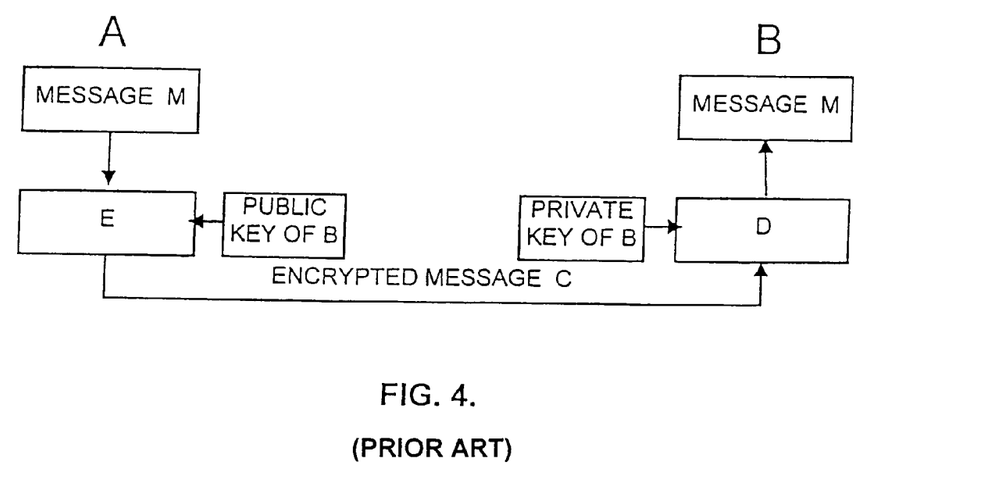
FIG. 4 shows an encryption procedure based on a public key.

A plurality of methods for securing a connection between two network elements is known in prior art. FIGS. 3 and 4 of the attached drawings show block diagrams of two known encryption algorithms which can be used to protect a transmission: a symmetric and an asymmetric algorithm.

FIG. 3 shows a symmetric encryption process based on a secret key shared between the participants. At party A's end the message to be sent to party B is encrypted with the shared secret key. The message is sent over a transmission route in encrypted form. The receiving party B decrypts the encrypted message with the same secret key K to retrieve the original message. An intruder eavesdropping the transmission needs to learn the secret key in order to be able to read and understand the encrypted message which has been transmitted. Another alternative is to find a weakness in the algorithm itself. Therefore, it is preferable to use publicly analyzed algorithms, such as the DES (Data Encryption Standard) algorithm. The encryption and decryption of the symmetric process can be expressed by the equations:

$$C = E_K(M) \text{ and}$$

$$M = D_K(C),$$

where C is the encrypted message, M is the message in plain text, $E_K$ is the encryption with key K, and $D_K$ is the decryption with key K.

FIG. 4 shows a public key encryption process which is an asymmetric approach. This algorithm is based on two keys: a public key and a private key. These two keys are related in such a manner that a message encrypted with a public key can only be decrypted with the corresponding private key and vice versa. The public key can be easily calculated by using the corresponding private key. However, it is computationally unfeasible to calculate a private key based on the corresponding public key. In FIG. 4 a message is encrypted at party A's end with the public key of the intended receiver, that is party B. The encrypted message is transmitted over a trans-mission line to party B's end, where it is decrypted with the corresponding party B's private key and the original message is retrieved. Again, publicly analyzed algorithms, such as the RSA (River-Shamir-Adleman) algorithm are preferred.

The encryption and decryption of the asymmetric algorithm can also be expressed by the following equations:

$$C = E_B^+(M) \text{ and}$$

$$M = D_B^-(C),$$

where C is the encrypted message, M is the message in plain text, $E_B^+$ is encryption with the receiver's public key $K_B^+$, and $D_B^-$ is decryption with the receiver's private key $K_B^-$. Due to the properties of the encryption function E, it is computationally unfeasible to decrypt a message encrypted using the public key of the recipient if the private key is not known.

Since asymmetric keys are usually much longer than symmetric keys, the asymmetric algorithm requires much more processing capacity. Thus, asymmetric algorithms are unsuitable for encrypting large amounts of data, since the public key process may be too slow for networks enabling very high transmission speeds.

Hybrid cryptography uses both the above algorithms together. For example, only session keys are exchanged using the public key algorithm, and the rest of the communication is encrypted applying the symmetric method.

In a public key algorithm the encryption of a message with the private key of the message sender acts as a digital signature, since anyone can decrypt the message with the known public key of the sender. This feature can be utilized to provide message integrity and authentication in a connection. Use of digital signatures is shown in FIGS. 5 and 6.

Figure 5:
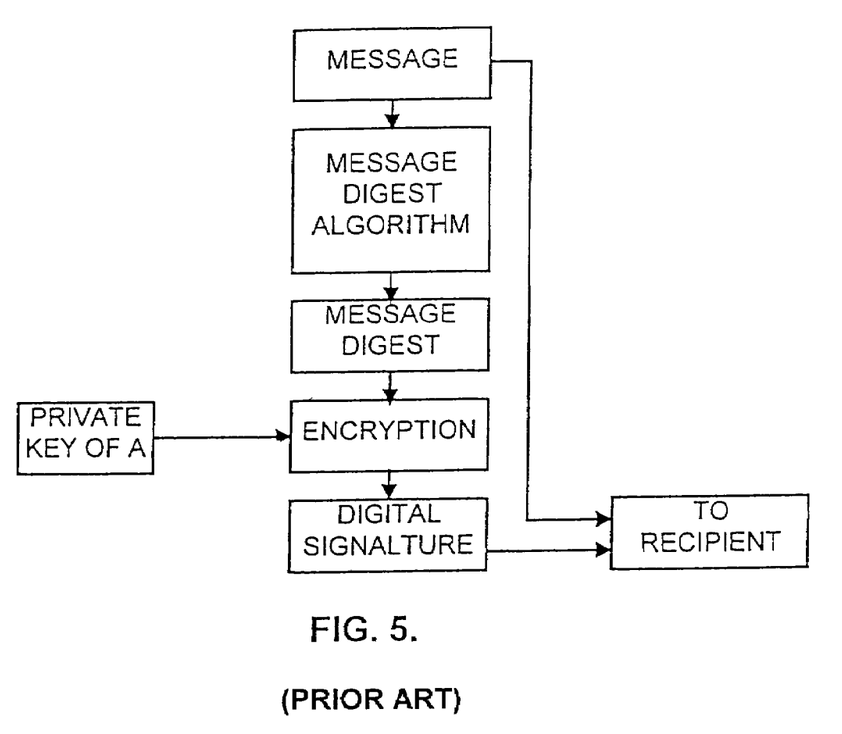
FIG. 5 shows the generation of a digital signature.

The procedure for generating a digital signature is shown in FIG. 5. The sender calculates from the message a message digest using a cryptographically strong one-way hash function. The message digest is some-what analogous to the error checking codes widely used in telecommunications. But contrary to the error checking codes, it is believed to be computationally unfeasible to substitute one message with another so as to produce an identical message digest.

The message digest is encrypted using the private key of the sender and the encrypted message digest is used as a digital signature. The digital signature is then sent to the receiver together with the message.

Figure 6:
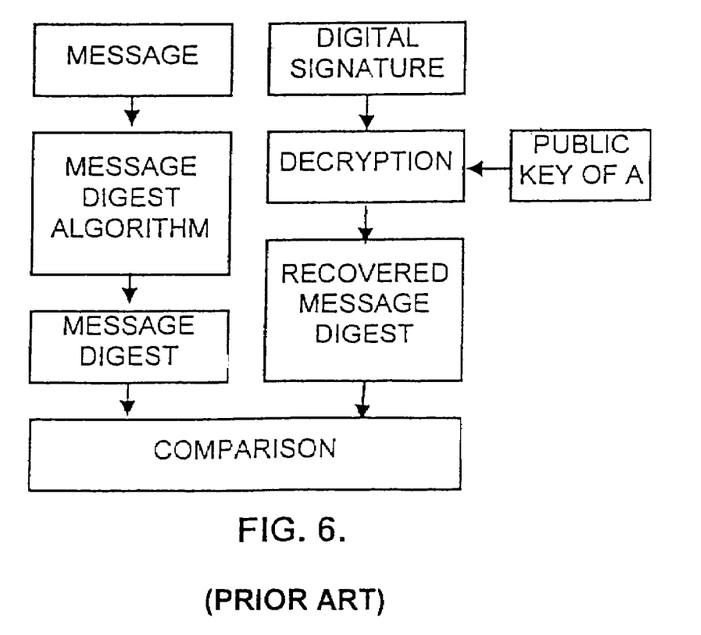
FIG. 6 shows the verification of a digital signature.

The procedure for the receiving party to verify a digital signature is shown in FIG. 6. Having received the message and the digital signature, the receiver calculates the message digest of the message using the message digest algorithm. If no alterations have occurred in the message, the resulting message digest is identical to the message digest calculated by the sender. On the other hand, due to the properties of the algorithm, it would be computationally unfeasible for an intruder to substitute the message with another that would produce an identical message digest.

The received digital signature is the message digest encrypted by using the private key of the sender. The message digest can thus be retrieved by decrypting the digital signature using the public key of the sender, which is known by the receiver. If decryption has taken place using the private key which corresponds to the public key of the assumed sender, the recovered message digest will be identical to the message digest calculated by the sender. This in turn is identical to the message digest calculated by the receiver only when no changes in the message have occurred. Thus, if the comparison shows that the message digest calculated from the received message and the message digest calculated by decrypting the digital signature are identical, it can be deduced that the message has not been altered and that it was sent by the claimed sender.

In the methodology of secret key encryption, message authentication can be provided using a Message Authentication Code MAC similar to the digital signature. For example, MAC can be calculated with a one-way hash algorithm in the following way:

$$MAC=H(K,M,K),$$

where K is the key, M is the message, and H is a hash function. The input cannot be deduced from the output. When MAC is attached to a message, the message cannot be corrupted or impersonated. The receiving party calculates MAC using the received message and the same hash function and key as the transmitting party and then compares this calculated MAC to the MAC attached to the message in order to verify it.

In this application, the term authenticity code is used as a common name for all codes providing a message with authenticity and integrity, i.e. for both the digital signatures and message authentication codes.

Figure 7:
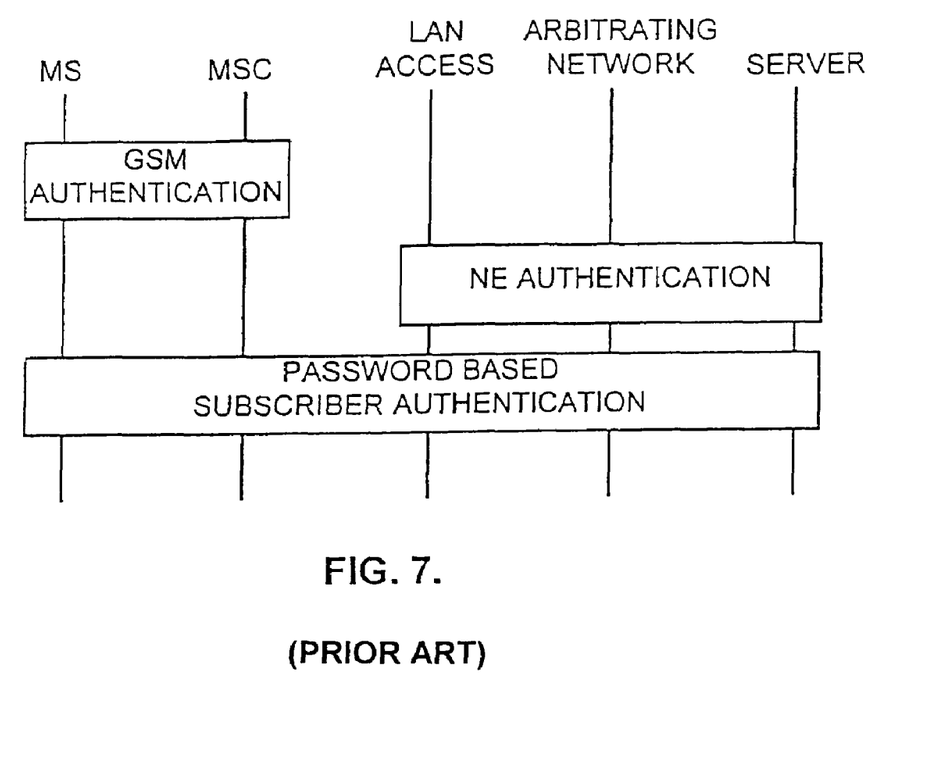
FIG. 7 shows an authentication method.

Prior art provides a means for secure data connection from the subscriber to the GSM network as well as from the private network of the operator to another private network such as a company network, as illustrated in FIG. 7. However, the operator network can be used by a plurality of users not all of whom are entitled to the services of the company network. In prior art, their access to the company network must be denied by using a password based authentication procedure between the subscriber and the company network. This is inconvenient because the password must be transferred whenever the connection is established.

The objective of the present invention is to solve the above problem. This objective is achieved by using the method and apparatus defined in the independent claims.

SUMMARY OF THE INVENTION

The basic idea of the invention is to forward the authentication of the telephone system to the leg between the private networks. According to the invention, a trusted operator network connected to the telephone system comprises an authentication server. Also a second private network which is here termed the company network, comprises a similar authentication server.

The authentication procedure is initiated when the subscriber requests a service provided by a server in the company network. During this procedure, the authentication server AS_O of the operator network signs a authenticated identification of the subscriber digitally using its own private key and forms a message comprising the identification and the signature. An example of identification suitable for the purpose of identifying the subscriber is the MSISDN (Mobile Subscriber Integrated Services Digital Network) number of the subscriber. The signature establishes authenticity the message. Preferably, the message is additionally encrypted using the public key of the authentication server AS_C of the company network. The encryption pre-vents an eavesdropper from identifying the user requesting a service. The signed and encrypted message is sent to the authentication server of the company network via the arbitrating network.

The authentication server of the company network receives the message and verifies the signature in order to establish the authenticity of the message. If encryption has been used, the message is decrypted using the private key of AS_C. The authentication server checks the subscriber's rights to the data service, and if the subscriber is entitled to the service, it generates the session key to be used in the connection. A message comprising the session key is transferred to the operator network preferably encrypted using the public key of AS_O and preferably signed using the private key of AS_C. Additionally, the session key is transferred to the server.

AS_O receives the encrypted and signed session key, decrypts the key using its own private key and verifies the authenticity of the key using the public key of AS_C. If the authentication procedure is successful, the session key is transferred to the network element handling the encryption of the data traffic, and the data traffic begins.

BRIEF DESCRIPTION OF THE FIGURES

The invention is described more closely with reference to the accompanying schematic drawings, in which.

DETAILED DESCRIPTION OF THE INVENTION

Figure 8:
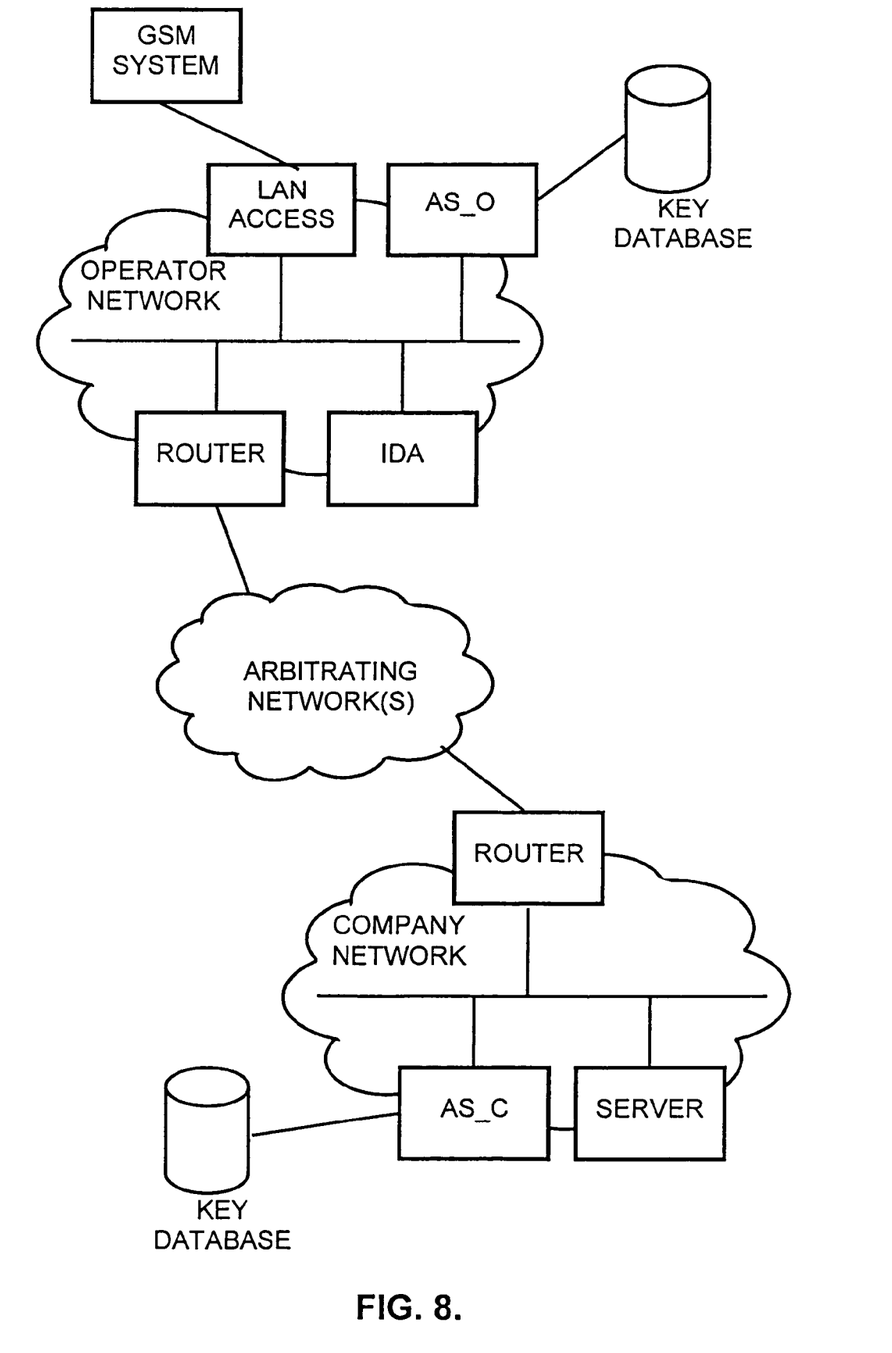
FIG. 8 shows two private data networks connected via arbitrating networks.

FIG. 8 shows two networks, an operator network and a company network, which are connected to each other via an arbitrating network. The operator network is connected to the user via a telephone system such as the GSM system. In both the operator network and the company network authentication servers have been added. The servers are called AS_O (Authentication Server in the Operator network) and AS_C (Authentication Server in the Company network). In addition, the authentication servers are connected to key databases. The key database connected to the authentication server AS_O of the operator network contains the following information:
- public keys of the authentication servers, such as AS_C of the company networks the operator network can be connected to and
- both the public and the private key of AS_O.

The key database connected to the authentication server AS_C of the company network contains the following information:
- the public key AS_O.
- both the public and the private key of AS_C.

This guarantees that no confidential information, such as private keys need to be transferred through the insecure arbitrating network. As explained earlier in this application, the public keys can be disclosed without any risk.

Figure 9:
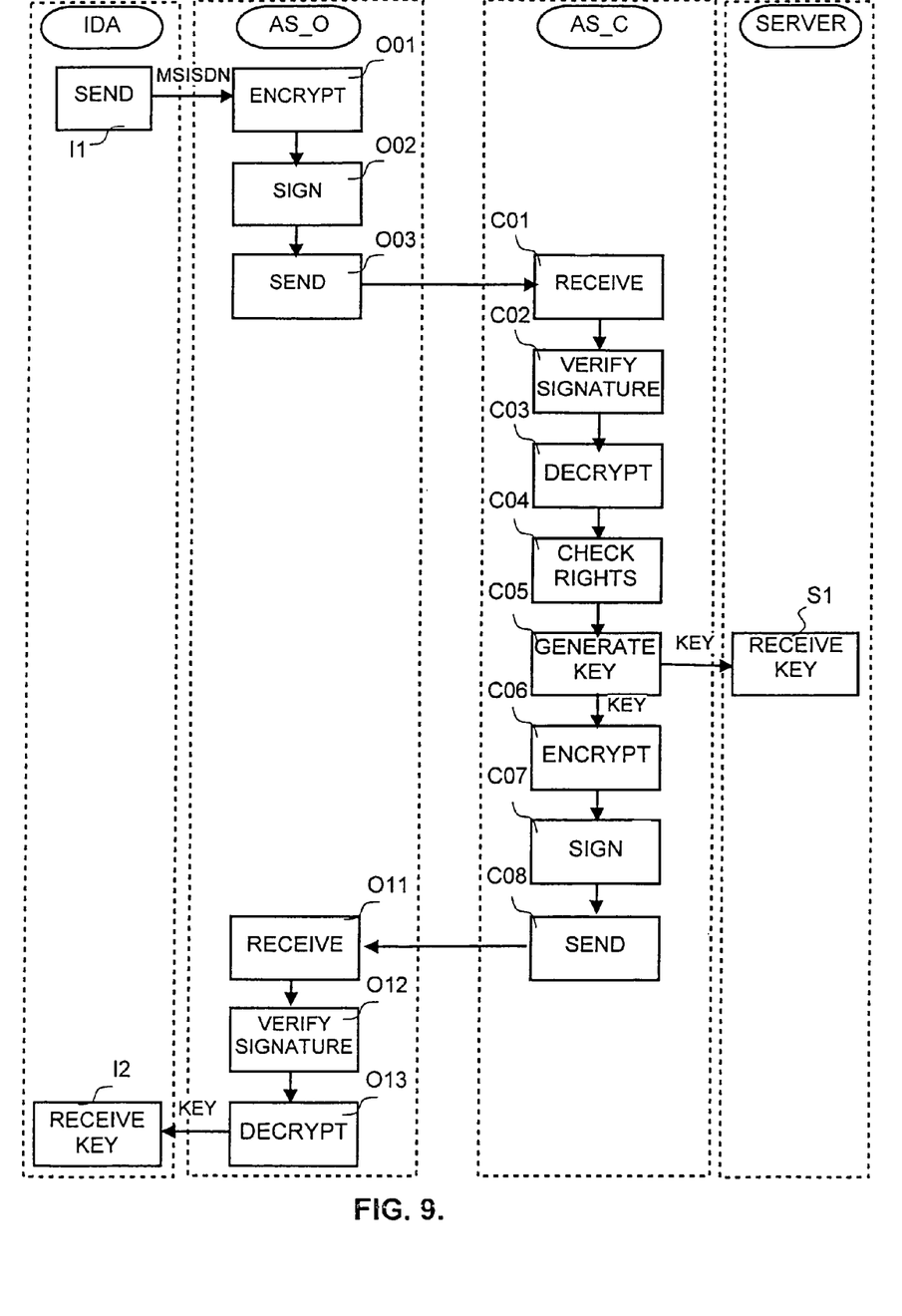
FIG. 9 shows an authentication procedure.

Let us next study examples of authentication and encryption procedures according to the invention. The authentication procedure is shown in FIG. 9. The procedure is triggered by a request for an incoming data call. The MSISDN number of the calling subscriber is forwarded to the IDA. Through mapping of the MSISDN number, the IDA establishes the identity of the server to whose services the subscriber requests access as well as the identity of the authentication server AS_C of the company network in which the server is located. This information is then forwarded to the authentication server AS_O at stage 11.

In response to having received the MSISDN number of the calling subscriber and the identity of the authentication server OA_C, AS_O
1. generates a digital signature based on the MSISDN number with its own private key (stage O01),
2. encrypts the MSISDN number and the digital signature using a public key method and the public key of AS_C stored in the key database (stage O02), and
3. sends the encrypted MSISDN number and the signature to AS_C (stage O03).

An example of a public key encryption method suitable for use in this invention is the well known RSA algorithm.

It is to be noted that if the digital signature is calculated only on the basis of the MSISDN number, all the messages comprising the same MSISDN number are identical. This makes it possible to track the traffic of a subscriber. To overcome this problem, it is preferable that the digital signature not be calculated on the basis of the MSISDN number only, but that the MSISDN number is signed together with a random number. Thus, the messages identifying the same subscriber are not identical, making tracking of the subscriber impossible or at least much more difficult.

AS_C receives the signed and encrypted message at stage C01. At stage C02 it decrypts the message using its own private key stored in its key database. Having now retrieved the message and the digital signature in plain text, at stage P03 AS_C verifies the digital signature using the public key of AS_O in order to establish the authenticity of the message.

AS_C now holds the identification of the subscriber requesting the data service and has established that the request was received from a trusted network, i.e. the operator network. At stage C04 AS_C consults its database and checks the access permission attached to that subscriber, i.e. that MSISDN number.

If the subscriber is entitled to the service, a session key for this particular session is generated at stage C05. The key is sent to the server, which receives it at stage S1. To provide the session key with secure trans-mission over the arbitrating network to the authentication server AS_O of the operator network, the public key algorithm together with a digital signature is used. The digital signature is generated using the private key of AS_C at stage P06. To make it even more difficult for an intruder to learn the session key, the session key is preferably signed together with a random number. The message and the digital signature are then encrypted using the public key of AS_O at stage P07. The signed and encrypted message is then sent to AS_O via the arbitrating network at stage P08.

AS_O receives the signed and encrypted message containing the session key at stage O11. It decrypts the message using its own private key at stage O12. Having now retrieved the session key in plain text and the digital signature, AS_O verifies the signature using the public key of AS_C at stage O13. This verification proves the authenticity of the message. If the verification shows that the session key was sent by the claimed sender, i.e. AS_C, AS_O forwards the session key to the IDA at stage O13. The IDA receives the key at stage 12.

It is to be noted that the order of signing the message digitally and encrypting the message may vary. Likewise, it must be noted that the signing procedures can be replaced by other procedures such as the use of message authentication code.

Figure 10:
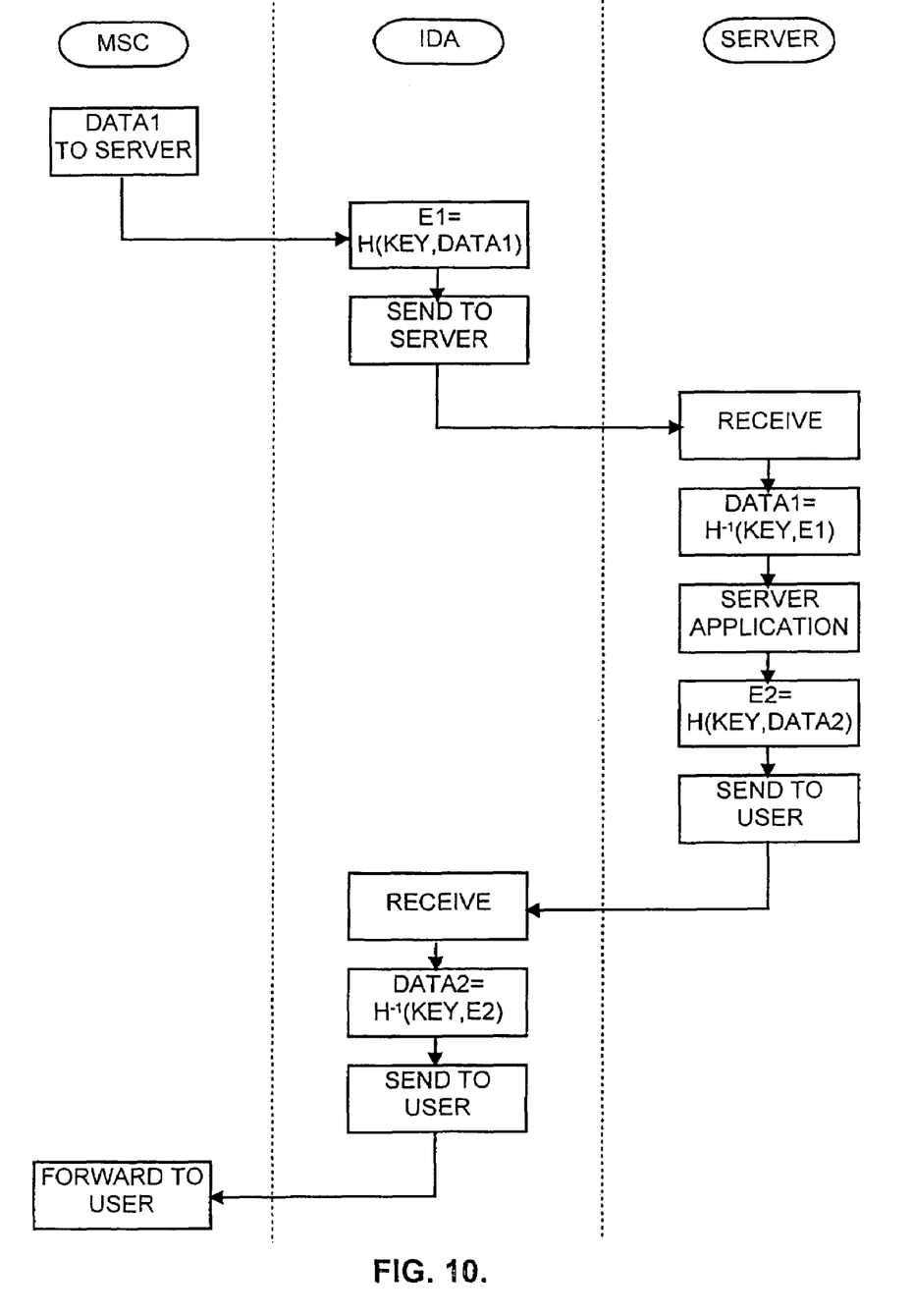
FIG. 10 shows an encryption procedure.

The session key is now held by both the server providing the requested data service and the IDA. The actual data transmission can now take place. The data is transferred over the arbitrating network in encrypted form. The encryption procedure is shown in FIG. 10.

In the data connection, the data is first sent from the mobile station of the subscriber to the mobile switching center MSC using the GSM service and its data security functions. The MSC forwards the data DATAL sent by the mobile station to the IDA. The IDA receives the data and encrypts it using a symmetric encryption method and the session key KEY received from AS_O. An example of a symmetric encryption algorithm suitable for use is the well known DES algorithm. The encrypted message E1 is sent to the server over the arbitrating network.

The server receives the encrypted message and retrieves the sent data DATAL by decrypting the encrypted message E1 using the session key KEY which it received from AS_C during the authentication procedure at stage S1 of FIG. 9. The retrieved data is forwarded to the server application.

As the server application sends data DATA2 to the subscriber, the encryption algorithm running at the server encrypts the data using the session key KEY. The encrypted data message is then sent to the IDA at the operator network.

The IDA of the operator network receives the message and decrypts it using the session key. Now having the message in plain text, the IDA sends it to the subscriber via the mobile switching center.

Figure 11:
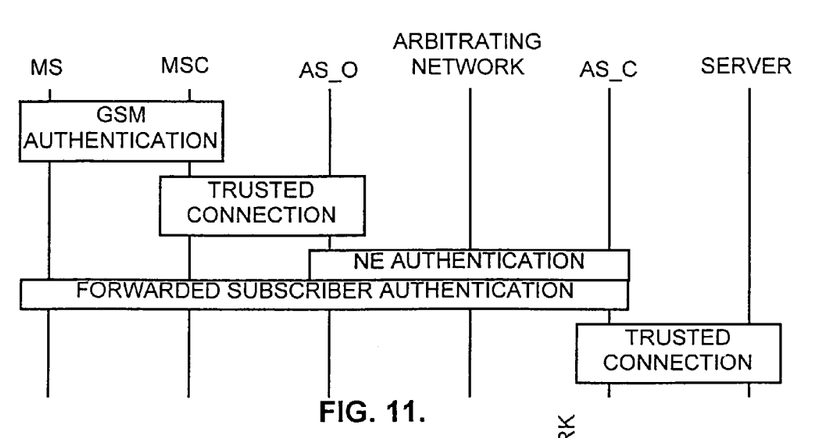
FIG. 11 shows forwarded authentication.

The process of forwarded authentication is shown in FIG. 11. The leg between the mobile subscriber MS and the mobile switching center MSC is authenticated by means of the GSM authentication procedure. With the help of this procedure, the mobile switching center can establish that the identifying information provided by the mobile subscriber is correct, i.e. truly own MSISDN number. AS_O is connected to the MSC via the trusted private data network of the operator. Therefore, AS_O can ascertain that the sub-scriber is indeed identifying himself correctly.

To establish a connection to the server, the AS_O sends AS_C the MSISDN number over the arbitrating network in an encrypted and signed form. The encryption ensures that the message can only be read by the recipient intended, i.e. the trusted network element AS_C of the company network. The signature authenticates AS_O to AS_C. In response to successful verification of the signature of the message AS_C thus establishes that the message is from a trusted network element AS_O. Therefore, also the identity of the subscriber requesting the service can be trusted. Thus, the mobile subscriber is authenticated to AS_C. Both AS_C and the server are in the same company network, and the network elements inside the company network trust each other. Therefore, also the server can be assured that the subscriber is revealing his true identity.

The preferred embodiment of the invention provides authentication of AS_C of the company network to AS_O of the operator network. This is achieved by using the public key encryption method when sending the message containing information of the subscriber identity from AS_O to AS_C. In addition or alternatively authenticity is verified by means of the digital signature of the message containing the session key and sent from AS_C to AS_O. If the operator network is authenticated to the MS, the authenticity of AS_C is also forwarded to the subscriber. This means that the company network can be sure of the identity of the subscriber and the sub-scriber can be sure of the identity of the company network.

Figure 12:
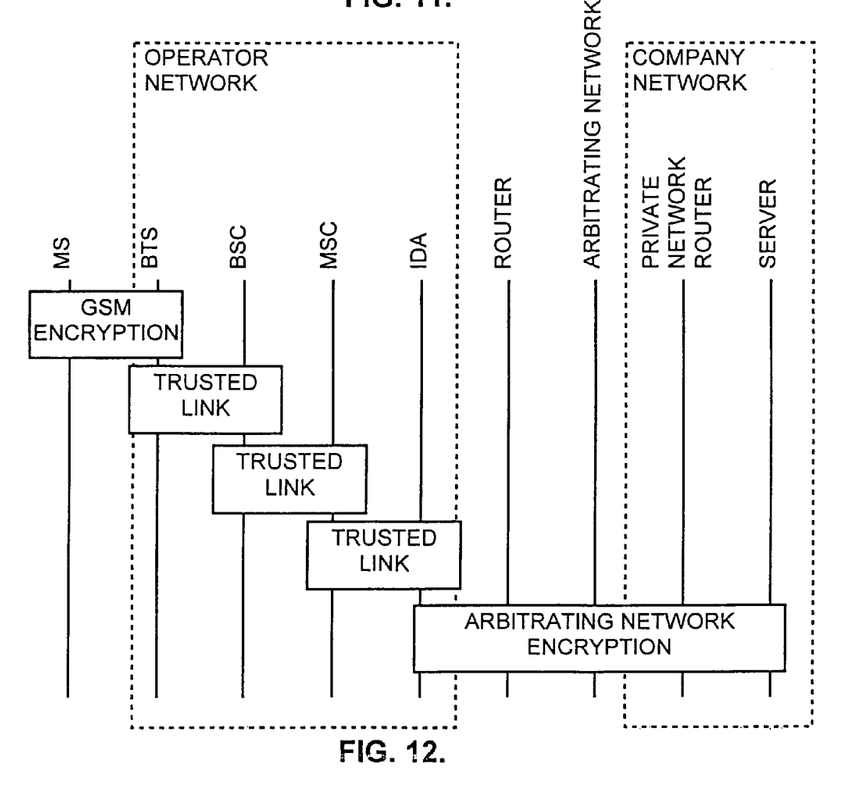
FIG. 12 shows secure data transfer.

The basis for the security of data transfer can be studied with reference to FIG. 12. On the leg between the mobile station MS and the base station BTS an encryption method according to GSM specifications is used. From BTS to the IDA, the transmission path is trusted. On the leg from the IDA over the arbitrating network to the server, the symmetric encryption method is used. The encryption chain is similar in both transmission directions, i.e. from the MS to the server and vice versa. Thus, end to end connection between the mobile station and the server is secure.

Figure 13:
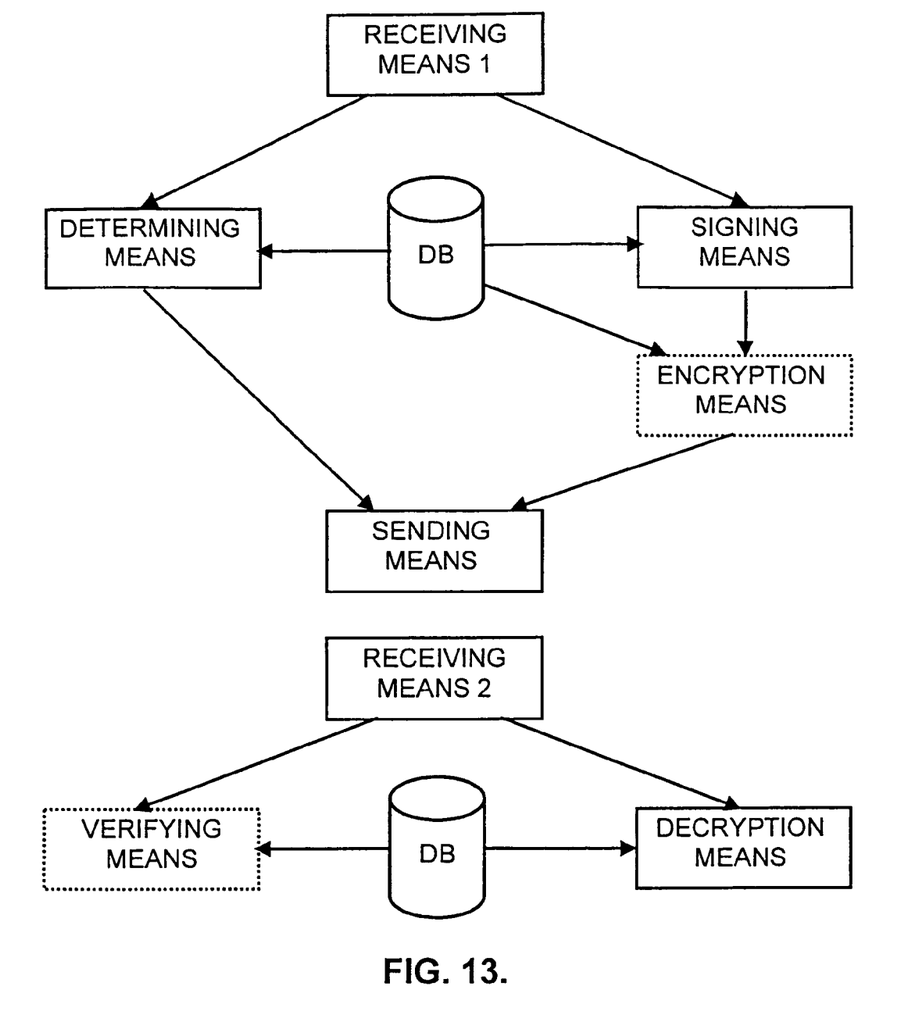
FIG. 13 shows the authentication server of the operator network.
Figure 14:
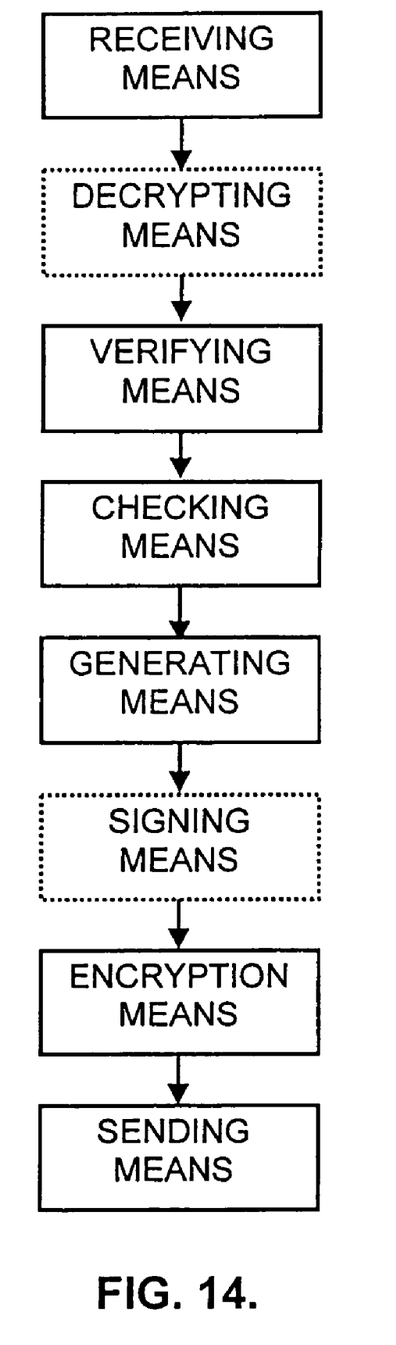
FIG. 14 shows the authentication server of the company network.

The functionalities needed in the authentication servers are presented in FIGS. 13 and 14. FIG. 13 depicts the functionalities of the authentication center AS_O in the operator network. The server has
  receiving means for receiving the subscriber identity from the telecommunication network,
  determining means responsive to the receiving means for determining the identity of a second authentication server on the basis of the identity of the subscriber,
  signing means responsive to the receiving means for generating a digital signature, and
  sending means responsive to the receiving means, the determining means and the signing means and having the functionality of sending the identity and the signature to the authentication server of the company network.

The mapping means and the signing means need information about the subscriber's services and the private key of the server, which can be found in the database DB.

To encrypt the subscriber identity according to the preferred embodiment before sending it over the arbitrating network, encryption means responsive to the signing means is also needed. It must be noted that the order of signing and encryption may vary. The encryption means requires the public key of the authentication server of the company network, and is therefore connected to the database DB.

To be able to receive the session key from the other authentication server, the authentication server has also second receiving means for receiving an encrypted session key from the authentication server of the company network, and decrypting means responsive to the second receiving means for decrypting the encrypted session key. If the authentication server of the company network signs the session keys according to the preferred embodiment, the authentication server of the operator network must in addition have verifying means responsive to the second receiving means for verifying the a digital signature calculated from the session key.

The means needed in the authentication server of the company network are shown in FIG. 14. The authentication server has
  receiving means for receiving a subscriber identity and a digital signature calculated from the subscriber identity and the identification of a service requested by the subscriber from the authentication server of the operator network,
  verification means responsive to the receiving means for verifying the digital signature,
  checking means responsive to the receiving means for checking whether the subscriber is entitled to the requested service,
  generation means responsive to the checking means for generating a session key,
  encryption means responsive to the generation means for encrypting the session key, and
  sending means responsive to the encryption means for sending the encrypted message to another authentication server.

If the subscriber identity is encrypted before it is sent it to the company network, the authentication server has in addition a means responsive to the receiving means for decrypting the subscriber identity using the private key of the authentication server. Further, if the authentication server of the company network is to sign the session key before sending it to the authentication server of the operator network, the authentication server must in addition have a signing means responsive to the generating means for signing the session key using the private key of the authentication server.

It must be noted that the scope of this invention is not limited to the above described exemplary embodiments. For example, identification other than a MSISDN number can be used when contacting the company network. The word "company network" is only used for clarity, as it can be any private network, not necessarily a closed data network of a company. It can as well be a private network operated by a network operator and requesting user authentication, for example. This can be implemented by determining the identification used in the company network on the basis of the MSISDN number of the subscriber. The mapping can be done in AS_O, for example. The order of signature generation and encryption may also differ from the order used in the examples. That is, the messages may be encrypted first and then signed.

In the examples for this application, the authentication server, the IDA and the LAN access unit were described as separate network elements. However, this is not crucial for the invention, and a plurality of these functionalities may be implemented in a single network element. Also, one functionality may be distributed over a plurality of network elements. Likewise, the signature can be sent in plain text. In this embodiment the message is encrypted and the signature is attached to the encrypted message without encryption.

It must as also understood that use of the invention is not limited to a GSM system the system used in the examples for this application, but the invention can be used, with any telecommunication system in which sub-scribers are authenticated securely and which is connected to a private network. One example of such a telephone system is the fixed telephone system. Another example of a mobile telecommunication system is the GPRS (General Packet Radio System).

The invention claimed is:

1. A method, comprising:
providing security of data connections in an arrangement comprising
a telecommunication network comprising subscribers,
a first private data network connected to the telecommunication network,
a second private data network connected to the telecommunication network via the first private network, the second private data network comprising a server providing data services;
authenticating the subscriber between the telecommunication network and the first private data network using an authentication procedure provided by the telecommunication network;
forming, in the first private network, a message comprising the identification of the subscriber received from the telecommunication network and an authenticity code of the message;
determining, in the first private data network, the identity of the server of the second private data network based on the received identification of the subscriber;
sending said message to the server of the second private data network; and
in response to having received the message in the second private data network:
verifying the authenticity code,
checking the identified user's right to the requested service, and
when the user is entitled to the requested service, generating and sending a reply to the first private data network.

2. The method according to claim 1, further comprising:
configuring the telecommunication network to be a mobile telecommunication network.

3. The method according to claim 1, wherein the forming the message comprising the subscriber identification comprises including a mobile station international integrated services digital network number of the subscriber in the message.

4. The method according to claim 1, wherein the authenticity code is a message authentication code medium access control.

5. The method according to claim 1, wherein forming the message comprising the authenticity code comprises including a digital signature in the message.

6. The method according to claim 5, further comprising:
digitally signing the identification of the subscriber in an authentication server installed in the first private data network.

7. The method according to claim 6, wherein the digitally signing the identification comprises using the private key of the authentication server.

8. The method according to claim 7, further comprising:
storing the key in a key database attached to the authentication server.

9. The method according to claim 1, further comprising:
encrypting the subscriber identity using a public key encryption method before it is sent from the first private data network to the second private data network.

10. The method according claim 9, wherein the encrypting the subscriber identity comprises encrypting the subscriber identity in an authentication server installed in the first private data network.

11. The method according to claim 1, further comprising:
installing an authentication server in the second private data network; and
encrypting the identity of the subscriber using the public key of the authentication server of the second private data network.

12. The method according claim 11, further comprising:
storing the key in a key database attached to the authentication server of the first private network.

13. The method according claim 1, further comprising:
installing an authentication server in the second private data network; and
in the authentication server, verifying the authenticity code, checking the user's right to the requested service, and generating a reply.

14. The method according claim 13, further comprising:
installing an authentication server in the first private data network; and
verifying the authenticity code using the public key of the authentication server of the second private data network.

15. The method according claim 14, further comprising:
storing the public key of the authentication server of the first private data network in a key database attached to the authentication server of the second private data network.

16. The method according claim 1, wherein the sending the reply comprises sending a session key to be used to encrypt the data traffic on the leg between the first and the second private data networks in a connection to be established between the subscriber and the server.

17. The method according claim 16, further comprising:
digitally signing the reply comprising the session key in the second private data network.

18. The method according claim 17, further comprising:
installing an authentication server in the second private data network; and
signing the reply comprising the session key using the private key of the authentication server.

19. The method according to claim 1, further comprising:
installing an authentication server in the first private data network; and
encrypting the reply using a public key of the authentication server of the first private data network.

20. The method according to claim 19, further comprising:
installing an authentication server in the second private data network; and
encrypting the reply comprising the session key in the authentication center of the second private data network.

21. An authentication server, comprising:
a receiver unit configured to receive a subscriber identity from a telecommunication network connected to a data network for which the authentication service is provided;
a determination unit configured, responsive to the receiver unit, to determine the identity of a second authentication server in a second data network based on the identity of the subscriber, wherein the second data network is connected to the telecommunication network via the data network;

a signer unit configured, responsive to the receiver unit, to generate a digital signature; and a sender unit configured, responsive to the receiver unit, the determination unit, and the signer unit, to send the identity and the signature to the second authentication server.

22. The authentication server according to claim 21, further comprising:

an encryption unit configured, responsive to the receiver unit and the determination unit, to encrypt the identity using the public key of the second authentication server.

23. The authentication server according to claim 21, further comprising:

a second receiver unit configured to receive an encrypted session key from the second authentication server; and a decryption unit configured, responsive to the second receiver unit, to decrypt the encrypted session key.

24. The authentication server according to claim 23, further comprising:

a verification unit configured, responsive to the second receiver unit, to verify a digital signature calculated based on the session key.

25. An authentication server, comprising:

a receiver unit configured to receive a subscriber identity, an identification of a service request by the subscriber, and a digital signature calculated by another authentication server from the subscriber identity and the identification of the service requested by the subscriber;

a verification unit configured, responsive to the receiver unit, to verify the digital signature;

a checker unit configured, responsive to the receiver unit, to check the subscriber's right to the requested service;

a generation unit configured, responsive to the checker unit, to generate a session key;

an encryption unit configured, responsive to the generation unit, to encrypt the session key; and a sender unit configured, responsive to the encryption unit, to send an encrypted message comprising the session key to the another authentication server.

26. The authentication server according to claim 25, further comprising:

a decryption unit configured, responsive to the receiver unit, to decrypt the subscriber identity using a private key of the authentication server.

27. The authentication server according to claim 25, further comprising:

a signer unit configured, responsive to the generation unit, to sign the session key using a private key of the authentication server.

28. An authentication server, comprising:

receiving means for receiving a subscriber identity from a telecommunication network connected to a data network for which the authentication service is provided;

determining means responsive to the receiving means for determining the identity of a second authentication server in a second data network based on the identity of the subscriber, wherein the second data network is connected to the telecommunication network via the data network;

signing means responsive to the receiving means for generating a digital signature; and sending means, responsive to the receiving means, the determining means, and the signing means, for sending the identity and the signature to the second authentication server.

29. An authentication server, comprising:

receiving means for receiving a subscriber identity, an identification of a service request by the subscriber, and a digital signature calculated by another authentication server from the subscriber identity and the identification of the service requested by the subscriber;

verification means responsive to the receiving means for verifying the digital signature;

checking means responsive to the receiving means for checking the subscriber's right to the requested service;

generation means responsive to the checking means for generating a session key;

encryption means responsive to the generation means for encrypting the session key; and sending means responsive to the encryption means for sending an encrypted message comprising the session key to the another authentication server.

* * * * *